E. PARRADEE.
AUTOMOBILE BUMPER.
APPLICATION FILED FEB. 21, 1917.
1,247,142.
Patented Nov. 20, 1917.
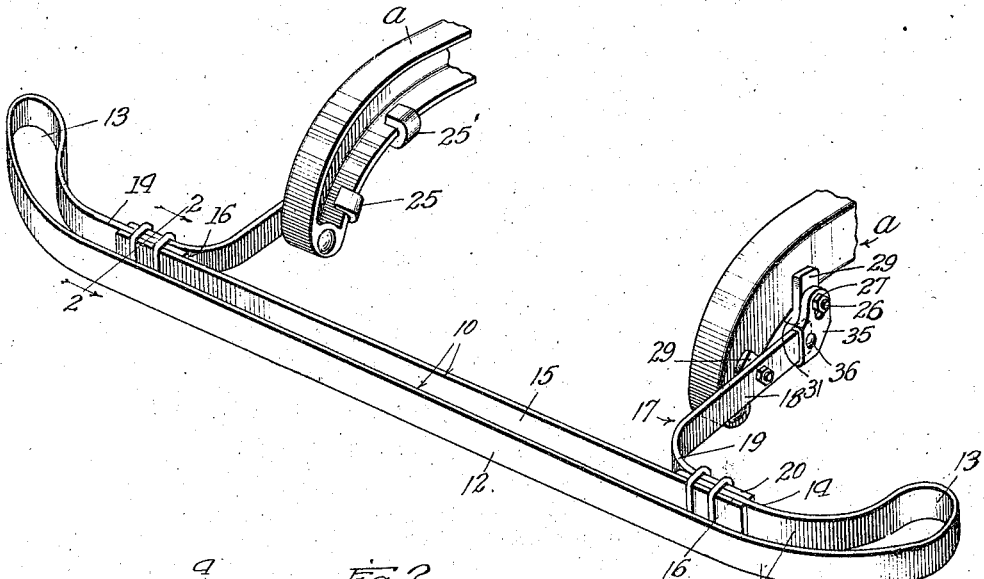
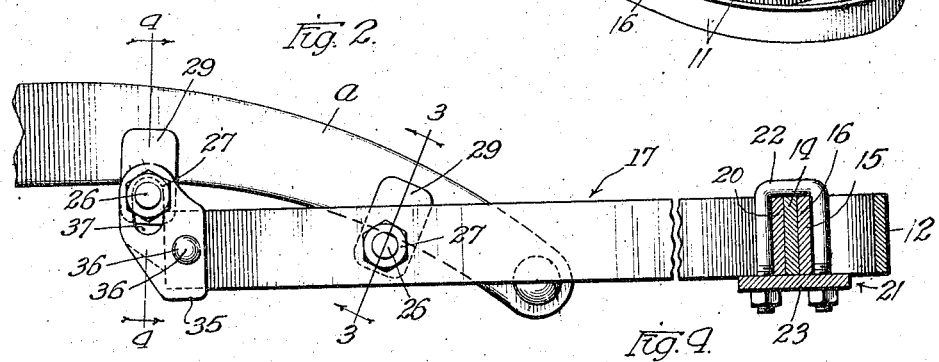
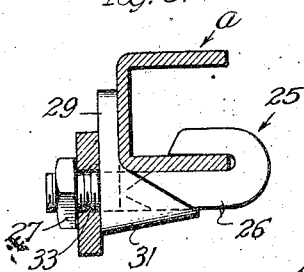
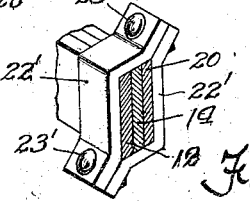
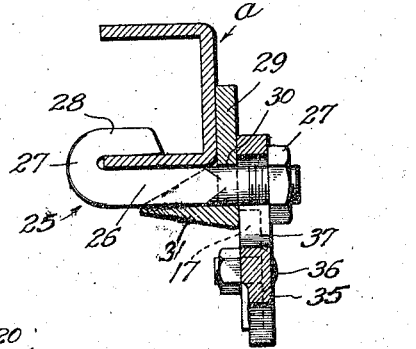
Witnesses:
Inventor
Edward Parradee

UNITED STATES PATENT OFFICE.

EDWARD PARRADEE, OF CHICAGO, ILLINOIS.

AUTOMOBILE-BUMPER.

1,247,142.

Specification of Letters Patent.

Patented Nov. 20, 1917.

Application filed February 21, 1917. Serial No. 149,979.

*To all whom it may concern:*

Be it known that I, EDWARD PARRADEE, a citizen of the United States, residing at Chicago, in the county of Cook and State of Illinois, have invented certain new and useful Improvements in Automobile-Bumpers, of which the following is a specification.

My invention relates to automobile bumpers, and its general objects are to provide, in such a structure, advantageous resiliency for absorption of shocks and jars, simplicity of construction for easy and economical manufacture, convenient adjustability and advantageous correlation of parts for ease of application to many makes of cars and efficient coöperation of the bumper with the car to prevent damage to the latter; and attractiveness of appearance in use.

The features of construction and arrangement constituting my invention are pointed out in the following specification and appended claim, and find one advantageous embodiment in the construction specially shown in the drawings, wherein—

Figure 1 is a perspective view of the bumper applied to the front end of a motor car frame;

Fig. 2 is a sectional view on the line 2—2 of Fig. 1;

Fig. 3 is a sectional view on the line 3—3 of Fig. 2;

Fig. 4 is a sectional view on the line 4—4 of Fig. 2; and

Fig. 5 is a perspective view of a modified form of clamp.

The transverse member or bar of the bumper, shown at 10, comprises a flat steel band 11 of appropriate length bent to provide a front course or leaf 12 to extend the full width of the car and at the sides thereof preferably to bow rearwardly, end curves or bends 13, preferably somewhat pear-shaped to avoid curvatures of weakeningly-short-radius and stubs 14 paralleling the front course 12, spaced a few inches apart therefrom, and terminating in confronting ends separated transversely by a distance somewhat less than the ordinary width of an automobile frame. A rear strap 15, kindred in material to the member 11, spans this gap and overlaps, as at 16, the contiguous ends of the stubs 14 for a distance (say six inches) sufficient to include the commercially expectable variation in width of automobile frames. When the overlapped ends are secured together, as hereinafter described, the bar 10 thus comprises a two piece loop of a spring steel band having end curves integral with the front course of the loop, and its two courses, front and back, arranged in substantial parallelism with the relatively deep narrow band edge-down.

Such bar is supported on spring supports 17, preferably of like material, each providing a straight leg 18 to extend in parallelism with the side frame of the car, a spring curve 19 at its outer end, and a foot 20 bent laterally outward to parallel the rear course of the bar and rest flat against the contiguous stub 14 thereof.

The feet 20 of the supports are adjustably clamped to the overlapped portion 16 of the rear course of the bar, and to this end I provide in each clamp a pair of U-bolts 22 snugly embracing the triple ply of metal formed by the ends of the stubs 14, strap 15 and foot 20, and at their lower ends passing through a plate 23 to be secured by the complemental nuts. It will be apparent that by this construction the supporting legs 18 may be adjusted as to lateral separation through a range adequate to fit the bumper to cars of different frame widths. In Fig. 5 I have illustrated a modified form of clamp comprising two duplicate L-shaped pieces 22'—22' secured together by bolts 23'.

The rear portion of each leg 18 is secured to the down-bending horn $a$ of the side sill of the car frame preferably by front and rear clamps 25 and 25' that may be substantial duplicates in construction. Each clamp preferably comprises a stem 26 to receive a nut 27 at its outer end and thence extending, preferably in broadened and flattened form, adapted to lie flush against the underside of said frame channel to a U-bend 27 of a terminal hook 28 so that hooked stem may embrace the sheet metal bottom flange of the channeled car frame member and bear against both the top and bottom thereof. Over the outer portion of the stem is slipped a clamp fitting 29 having a stem receiving opening 30 preferably underlain by a braced bearing plate 31 integral with the vertical course of the clamp and suitably shaped to coöperate with the squared portion of the stem. When the nut is screwed home to cause pressure to be exerted on the clamp member 29 the frame is very firmly and rigidly gripped between the jaw 29 and the hooked stem. Each supporting leg has an opening 33 to receive the stem of the front clamp 25 by direct engagement, the leg lying between the bolt and the clamp jaw 29, as shown in Fig. 3. Owing, however, to the fact that the horn *a* of the machine is generally down-turned, more or less, in order that the leg shall be level its rear extremity should be adjustable with respect to the rear clamp 25'. Accordingly I fit upon the extremity of leg 18 a bracket 35 anchored thereto, as at 36, and extending upwardly above the leg 18, such bracket having therein a slot 37 to receive the stem of the rear clamp in such relation to the slot as will level the supporting leg horizontally.

It will be apparent that the construction described affords a very rigid anchorage of the bumper to the frame of the car and provides a bumper structure wherein the bar is formed of an effectively continuous loop that is very resilient and yet very strong, the resiliency as between the front and back courses of the bar giving it a most advantageous capacity for absorbing within the bar itself a material portion of any shocks to the bumper, and the provision of the rear course spaced from but coextensive with the front course affording a yielding stop to limit the extent of deflection of the center of the long span of the front course. Furthermore the union thus effected between the supporting arms insures a distribution of strain that tends to prevent either support from breaking and to prevent the horns of the car frame from being distorted even under severe shocks.

Having described my invention, what I claim is:—

In a bumper for automobiles the combination of spring arms secured to opposite sides of the automobile and having forwardly extending portions with outwardly projecting ends, a spring bar extending across the front of the automobile with the end portions bent rearwardly and then inwardly to form spring loops, the ends of the bar extending toward each other but spaced apart a distance less than the distance between the ends of the spring arms, a straight rear bar paralleling the mid-portion of the front bar and overlapping the ends of the front bar, and clamping means for securing together the adjacent ends of the spring arms, front bar and rear bar.

In testimony whereof I hereunto set my hand.

EDWARD PARRADEE.